United States Patent
Kim et al.

(10) Patent No.: US 9,828,450 B2
(45) Date of Patent: Nov. 28, 2017

(54) PROPYLENE-BASED ELASTOMER

(71) Applicant: LG CHEM, LTD., Seoul (KR)

(72) Inventors: Seul Ki Kim, Daejeon (KR); Eun Jung Lee, Daejeon (KR); In Sung Park, Daejeon (KR); Choong Hoon Lee, Daejeon (KR); Byoung Soo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/023,904

(22) PCT Filed: Jun. 10, 2015

(86) PCT No.: PCT/KR2015/005834
§ 371 (c)(1),
(2) Date: Mar. 22, 2016

(87) PCT Pub. No.: WO2015/190830
PCT Pub. Date: Dec. 17, 2015

(65) Prior Publication Data
US 2016/0251461 A1  Sep. 1, 2016

(30) Foreign Application Priority Data

Jun. 10, 2014 (KR) ............ 10-2014-0070110
Jun. 9, 2015 (KR) ............ 10-2015-0081130

(51) Int. Cl.
*C08F 210/00* (2006.01)
*C08F 210/06* (2006.01)
*C08F 4/659* (2006.01)

(52) U.S. Cl.
CPC ........ *C08F 210/06* (2013.01); *C08F 4/65908* (2013.01); *C08F 4/65912* (2013.01); *C08F 2500/08* (2013.01)

(58) Field of Classification Search
CPC .................................................. C08F 210/16
See application file for complete search history.

(56) References Cited

U.S. PATENT DOCUMENTS

| | | | |
|---|---|---|---|
| 5,064,802 A | 11/1991 | Stevens et al. | |
| 5,504,172 A | 4/1996 | Imuta et al. | |
| 6,525,157 B2 * | 2/2003 | Cozewith | C08F 210/06 526/160 |
| 6,884,850 B2 | 4/2005 | Schauder et al. | |
| 7,053,160 B1 | 5/2006 | Bingel et al. | |
| 7,452,949 B2 | 11/2008 | Okumura et al. | |
| 7,723,450 B2 | 5/2010 | Jones et al. | |
| 7,728,086 B2 | 6/2010 | Ciaccia | |
| 7,834,205 B2 | 11/2010 | Resconi et al. | |
| 2007/0244276 A1* | 10/2007 | Datta | C08F 210/06 526/126 |
| 2010/0093941 A1* | 4/2010 | Akai | C08F 210/06 525/240 |
| 2013/0085232 A1 | 4/2013 | Stewart | |
| 2014/0018506 A1 | 1/2014 | Resconi et al. | |
| 2015/0011770 A1 | 1/2015 | Lee et al. | |
| 2015/0291631 A1 | 10/2015 | Han et al. | |
| 2016/0244542 A1 | 8/2016 | Kim et al. | |

FOREIGN PATENT DOCUMENTS

| | | |
|---|---|---|
| CN | 104837848 A | 8/2015 |
| CN | 105636995 A | 6/2016 |
| EP | 0629632 A2 | 12/1994 |
| EP | 1462464 A1 | 9/2004 |
| EP | 2910559 A1 | 8/2015 |
| JP | 2002-037795 A | 2/2002 |
| JP | 3334052 B2 | 10/2002 |
| JP | 2004-527617 A | 9/2004 |
| JP | 2005-511751 A | 4/2005 |
| JP | 2008-069369 A | 3/2008 |
| JP | 2009-530341 A | 8/2009 |
| JP | 2009-533382 A | 9/2009 |
| JP | 2010-500418 A | 1/2010 |
| JP | 2013-049863 A | 3/2013 |
| KR | 10-0635413 B1 | 10/2006 |
| KR | 10-0820542 B1 | 4/2008 |
| KR | 10-2014-0007360 A | 1/2014 |
| KR | 10-1384401 B1 | 4/2014 |
| KR | 10-2014-0075589 A | 6/2014 |
| WO | WO 00/01745 A1 * | 1/2000 ............ C08F 210/16 |
| WO | 02-083753 A1 | 10/2002 |

OTHER PUBLICATIONS

International Search Report from PCT/KR2015/005834, dated Jun. 10, 2015.
Written Opinion of the ISA from PCT/KR2015/005834, dated Jun. 10, 2015.
"Metal-Alkyl Group Effects on the Thermodynamic Stability and Stereochemical Mobility of B(C6F5)3-Derived Zr and H Metallocenium Ion-Pairs",Colin L. Beswick and Tobin J. Marks, J. Am. Chem. Soc. 2000, 122, 10358.
"Propylene homo- and copolymerization with ethylene using an ethylenebis(1-indenyl) zirconium dichloride and methylaluminoxane catalyst system", Tsutsui et al, Journal Polymer, vol. 30, 1989, p. 1350.

\* cited by examiner

*Primary Examiner* — Rip A Lee
(74) *Attorney, Agent, or Firm* — Dentons US LLP

(57) ABSTRACT

Provided is a propylene-based elastomer having high tacticity and excellent mechanical properties. The propylene-based elastomer includes 50% by weight or more of a propylene-based repeating unit, and satisfies a particular relationship between an ethylene content and tacticity.

4 Claims, 1 Drawing Sheet

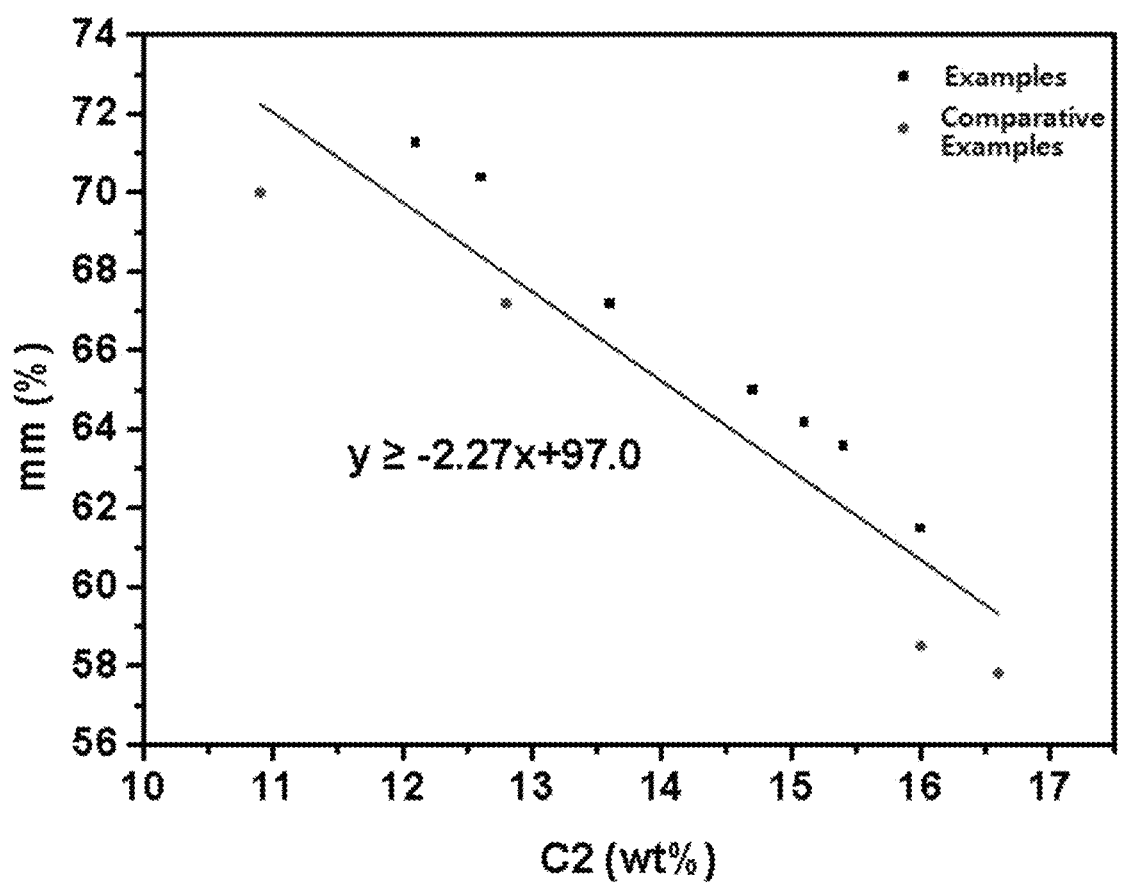

PROPYLENE-BASED ELASTOMER

CROSS REFERENCE TO RELATED APPLICATIONS

This application is a National Stage Entry of International Application No. PCT/KR2015/005834, filed on Jun. 10, 2015, and claims the benefit of and priority to Korean Application No. 10-2014-0070110, filed on Jun. 10, 2014, and Korean Application No. 10-2015-0081130, filed on Jun. 9, 2015, all of which are incorporated herein by reference in their entirety for all purposes as if fully set forth herein.

TECHNICAL FIELD

The present invention relates to a propylene-based elastomer having high tacticity and excellent mechanical properties.

BACKGROUND OF ART

Metallocene catalysts for olefin polymerization have been developed over a long period of time. Generally, metallocene compounds have been used after activated with aluminoxane, borane, borate, or other activators. For example, in the case of a metallocene compound having a ligand including a cyclopentadienyl group and two sigma chloride ligands, aluminoxane is adopted as an activator. It was reported that replacement of the chloride group with another ligand (e.g. benzyl or trimethylsilylmethyl ($-CH_2SiMe_3$)) in the metallocene compound exhibits effects of increased catalytic activity or the like.

EP 1462464 discloses an example of polymerization using a hafnium metallocene compound having chloride, benzyl and trimethylsilylmethyl groups. Also, results were reported that energy generation of active species varied depending on the type of alkyl ligand coupled with a central metal (J. Am. Chem. Soc. 2000, 122, 10358). Korean Patent No. 820542 discloses a catalyst for olefin polymerization having a quinoline-based ligand, and this patent pertains to a catalyst having a living group including silicon and germanium atoms in addition to the methyl group.

In the early 1990s, [$Me_2Si(Me_4C_5)NtBu]TiCl_2$ (Constrained-Geometry Catalyst, CGC) was disclosed by DOW in U.S. Pat. No. 5,064,802. In copolymerization of ethylene and alpha-olefin, CGC is superior to metallocene catalysts known to date in terms of (1) high activity even at high polymerization temperature to produce a polymer having a high molecular weight, and (2) very high ability to copolymerize alpha-olefin having high steric hindrance, such as 1-hexene and 1-octene. In addition, a variety of characteristics of CGC are gradually known upon polymerization, and thus ongoing research on synthesis of derivatives thereof to use as a polymerization catalyst has been conducted in academic and industrial fields.

As one approach, it was attempted to synthesize metal compounds including a nitrogen substituent and a variety of other bridges instead of a silicon bridge and to perform polymerization using the same. Representative metal compounds were known to contain phosphorus, ethylene or propylene, methylidene and methylene bridges, in lieu of the silicon bridge of the CGC structure, but did not exhibit superior polymerization activity or copolymerization performance when applied to ethylene polymerization or copolymerization of ethylene and alpha-olefin, compared to CGC.

As another approach, a large number of compounds having an oxido ligand instead of the amido ligand of CGC were synthesized, and there were some attempts to perform polymerization using the same.

However, when a propylene-based elastomer is prepared by using the known Group 4 transition metal catalyst, it is difficult to produce the propylene-based elastomer having high tacticity with high productivity and yield.

DETAILED DESCRIPTION OF THE INVENTION

Technical Problem

Accordingly, the present invention provides a propylene-based elastomer capable of satisfying high tacticity and excellent mechanical properties at the same time.

Technical Solution

The present invention provides a propylene-based elastomer including 50% by weight or more of a propylene-based repeating unit, and a residual amount of an olefin-based repeating unit containing ethylene, in which an ethylene content x (% by weight) and triad tacticity y (%) satisfy a relationship of $y \geq -2.27x+97.0$.

Hereinafter, a polypropylene-based elastomer according to a specific embodiment of the present invention will be described in detail.

According to an embodiment of the present invention, provided is a propylene-based elastomer including 50% by weight or more of a propylene-based repeating unit, and a residual amount of an olefin-based repeating unit containing ethylene, in which an ethylene content x (% by weight) and triad tacticity y (%) satisfy a relationship of $y \geq -2.27x+97.0$.

The propylene-based elastomer of an embodiment is obtained by copolymerization of propylene and alpha-olefin other than propylene within a predetermined content range, in which the ethylene content x (% by weight) and triad tacticity y (%) may satisfy a relationship of $y \geq -2.27x+97.0$, preferably a relationship of $y \geq -2.27x+97.5$. The propylene-based elastomer satisfying the relationship has high tacticity, compared to the conventional propylene elastomer having a similar ethylene content, which is prepared by a metallocene catalyst, thereby having excellent mechanical properties such as elongation, flexural modulus, and tear strength.

The triad tacticity y may be 50 to 80%, and preferably may be 60 to 75%.

Further, the relationship between the ethylene content and the triad tacticity may be satisfied in the entire ethylene content range of 10 to 20% by weight.

The propylene-based elastomer satisfying the above described relationship according to an embodiment may be prepared with high productivity and yield, which are peculiar to, for example, the Group 4 transition metal catalyst belonging to the category of the metallocene catalyst, and may have high tacticity, unlike the conventional propylene-based elastomers prepared by the metallocene-based Group 4 transition metal catalyst, thereby satisfying excellent mechanical properties.

Meanwhile, in the propylene-based elastomer of an embodiment, the triad tacticity may be measured by analyzing respective propylene-based elastomers using $^{13}$C-NMR, and expressed as the following Mathematical Equation 1:

Triad tacticity (%)=$PPP(mm)/\{PPP(mm)+PPP(mr)+PPP(rr)\}*100$     [Mathematical Equation 1]

wherein PPP(mm), PPP(mr) and PPP(rr) represent peak areas derived from the methyl groups of the second units in the following three propylene units consisting of head-to-tail bonds.

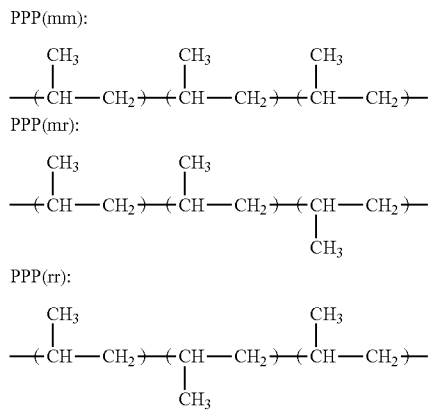

The $^{13}$C-NMR spectrum of the propylene-based elastomer may be measured as described in U.S. Pat. No. 5,504, 172. The spectrum relating to the methyl carbon region (19 to 23 ppm (part per million)) may be divided into a first region (21.3 to 22.4 ppm), a second region (20.5 to 21.3 ppm) and a third region (19.5 to 20.5 ppm). Each peak in the spectrum was assigned with reference to a document [the journal Polymer, Volume 30 (1989), page 1350]. In the first region, the methyl group of the second unit in the three propylene unit chain represented by PPP (mm) resonates. In the second region, the methyl group of the second unit in the three propylene unit chain represented by PPP(mr) resonates, and the methyl group (PPE-methyl group) of a propylene unit whose adjacent units are a propylene unit and an ethylene unit resonates in the vicinity of 20.7 ppm. In the third region, the methyl group of the second unit in the three propylene unit chain represented by PPP(rr) resonates, and the methyl group (EPE-methyl group) of a propylene unit whose adjacent units are ethylene units resonates in the vicinity of 19.8 ppm.

Based on the result of $^{13}$C-NMR analysis, triad tacticity may be calculated as follows. When the peak areas for the errors in propylene insertions are subtracted from the total peak areas of the second region and the third region, the peak areas based on the three propylene units-chains (PPP(mr) and PPP(rr)) consisting of head-to-tail bonds may be obtained. Thus, the peak areas of PPP(mm), PPP(mr) and PPP(rr) may be evaluated, and hence the triad tacticity may be determined from the Mathematical Equation 1.

Data for each propylene-based elastomer are displayed by plotting the ethylene content of the propylene-based elastomer on the x-axis and the measured triad tacticity of each elastomer on the y-axis. The data are then subjected to linear regression to determine the relationship between the ethylene content x and the triad tacticity y. An example of the relationship between x and y is as illustrated in FIG. 1.

As a result of the analysis by this method, it was confirmed that the propylene-based elastomer of an embodiment satisfies a particular relationship between the ethylene content x and the triad tacticity y. Accordingly, the propylene-based elastomer of an embodiment exhibits high tacticity, compared to the conventional propylene-based elastomers prepared by the metallocene catalyst, thereby having excellent elongation, flexural modulus, tear strength, etc.

Further, the propylene-based elastomer of an embodiment includes about 50% by weight or more, or about 60% by weight or more, or about 70% by weight to 95% by weight of the propylene-based repeating unit, and a residual amount of the olefin-based repeating unit containing ethylene. The propylene-based elastomer includes the propylene-based repeating unit and the olefin-based repeating unit within the above range, thereby satisfying high tacticity and excellent mechanical properties at the same time.

Meanwhile, the olefin-based repeating unit may further include alpha-olefin having 4 or more carbon atoms. As described above, the propylene-based elastomer must include ethylene as the olefin-based repeating unit, but may further include one or more alpha-olefins having 4 or more carbon atoms.

The alpha-olefin having 4 or more carbon atoms may be one or more alpha-olefins having 4 to 20 carbon atoms such as 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1dodecene, 12-ethyl-1-tetradecene, etc. Among them, 1-butene, 1-hexene, or 1-octene as a representative example may be properly used.

The propylene-based elastomer of an embodiment may have a density capable of satisfying the properties suitable for the propylene-based elastomer, for example, a density of about 0.860 to 0.890 g/cm$^3$.

Meanwhile, the propylene-based elastomer of an embodiment satisfying a particular relationship between the ethylene content and the triad tacticity may be prepared by polymerizing 50% by weight or more of propylene and a residual amount of an olefin-based monomer containing ethylene in the presence of a catalyst composition including a metallocene compound represented by the following Chemical Formula 1:

[Chemical Formula 1]

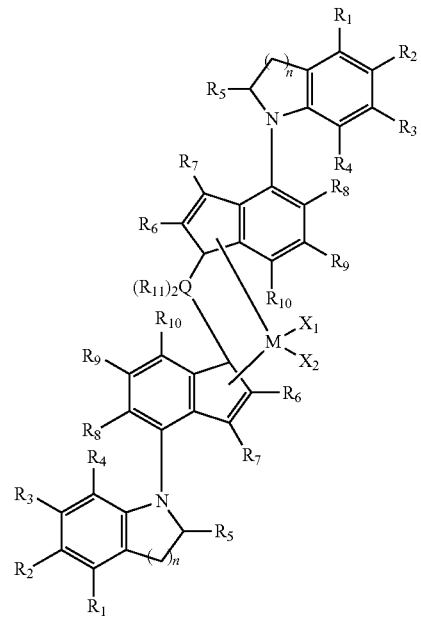

wherein n may be an integer of 1 to 2,
$R_1$ to $R_{10}$ may be the same as or different from each other, and each independently hydrogen, an alkyl group having 1 to 20 carbon atoms, an alkoxy group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, or a silyl group, in which 2 or more neighboring groups among $R_1$ to $R_{10}$ may be connected with each other by an alkylidyne group including an alkyl group having 1 to 20 carbon atoms or an aryl group having 6 to 20 carbon atoms to form a ring;

$R_{11}$ is hydrogen, a halogen group, an alkyl group having 1 to 20 carbon atoms, an alkoxy group having 1 to 20 carbon atoms, or an aryl group having 6 to 20 carbon atoms;

Q is carbon or silicon;

M is a Group 4 transition metal;

$X_1$ and $X_2$ are the same as or different from each other, and each independently halogen, an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, an alkylamino group having 1 to 20 carbon atoms, an arylamino group having 6 to 20 carbon atoms, or an alkylidene group having 1 to 20 carbon atoms.

As confirmed in the following examples, while predetermined amounts of monomers, that is, about 50% by weight or more, or about 60% by weight or more, or about 70 to 95% by weight of propylene, and a residual amount of the olefin-based monomer containing ethylene are used, each of the monomers is polymerized in the presence of a catalyst composition including the particular metallocene compound of Chemical Formula 1, thereby obtaining the propylene-based elastomer of an embodiment satisfying the particular relationship between the ethylene content and triad tacticity with high yield and productivity.

This is mainly attributed to excellent catalytic activity and comonomer reactivity of the particular metallocene catalyst. The metallocene compound represented by Chemical Formula 1 has a symmetrical crosslinked structure, in which a bisindenyl group forms a crosslinked structure via carbon or silicon, and a cyclic amine group containing an aromatic ring is linked to each indenyl group. Owing to this structural feature of the metallocene compound, the catalyst composition including the metallocene compound may exhibit excellent catalytic activity, and in particular, excellent selectivity and copolymerization reactivity for propylene and alpha-olefin.

However, when no catalyst including the particular metallocene compound of Chemical Formula 1 is used, or contents of the respective monomers are not within a proper range, the finally prepared propylene-based elastomer may not satisfy the particular relationship between the ethylene content and triad tacticity of an embodiment.

Meanwhile, in a preparation method of the above described propylene-based elastomer of an embodiment, the substituents defined in Chemical Formula 1 are specified below.

The alkyl group includes a linear or branched alkyl group.

The alkenyl group includes a linear or branched alkenyl group.

The aryl group has preferably 6 to 20 carbon atoms, and specific examples thereof include, but are not limited to, phenyl, naphthyl, anthracenyl, pyridyl, dimethylanilinyl, anisolyl, etc.

The alkylaryl group designates an aryl group substituted with the alkyl group.

The arylalkyl group designates an alkyl group substituted with the aryl group.

The halogen group designates a fluorine group, a chlorine group, a bromine group, or an iodine group.

The silyl group includes, but is not limited to, trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, etc.

The aryl group has preferably 6 to 20 carbon atoms, and specific examples thereof include, but are not limited to, phenyl, naphthyl, anthracenyl, pyridyl, dimethylanilinyl, anisolyl, etc.

The heterocyclic group designates a monovalent aliphatic or aromatic hydrocarbon group having cyclic atoms of 5 to 20 carbon atoms and including one or more heteroatoms, and it may be a single ring or a condensed ring of 2 or more rings. Further, the heterocyclic group may or may not be substituted with an alkyl group. Examples thereof may include indoline, tetrahydroquinoline, etc., but the present invention is not limited thereto.

In the metallocene compound represented by Chemical Formula 1, $R_1$ to $R_{10}$ may be more specifically each independently hydrogen, or an alkyl group having 1 to 20 carbon atoms, an aryl group having 6 to 20 carbon atoms, an alkylaryl group having 7 to 20 carbon atoms, an arylalkyl group having 7 to 20 carbon atoms, or a heterocyclic group having 5 to 20 carbon atoms, and $R_{11}$ may be an alkyl group having 1 to 20 carbon atoms or an aryl group having 6 to 20 carbon atoms.

The metallocene compound represented by Chemical Formula 1 may be any one or more compounds selected from the group consisting of compounds of the following formulae, but is not limited thereto:

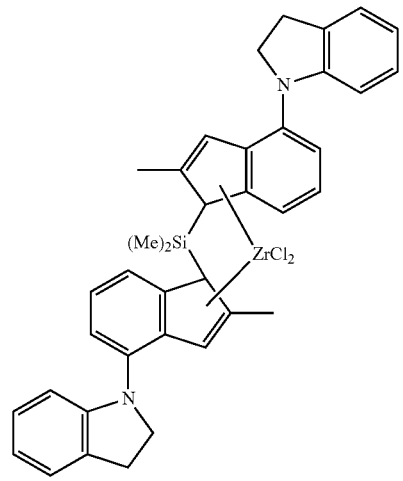

-continued
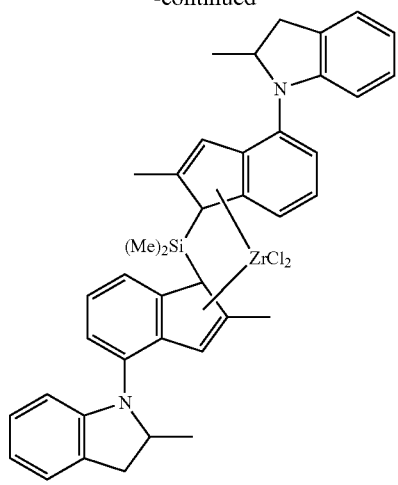
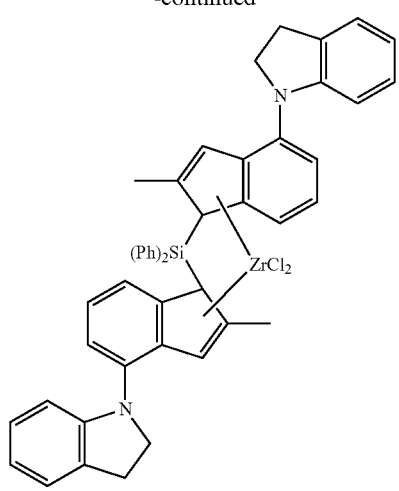
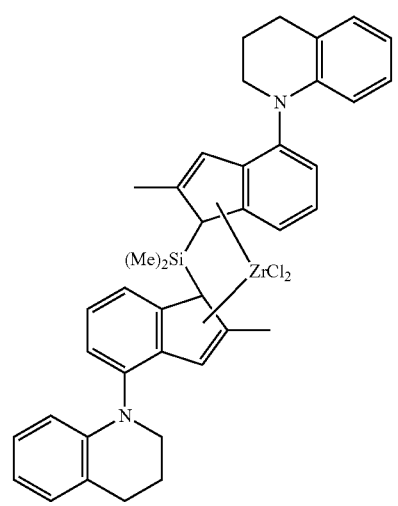
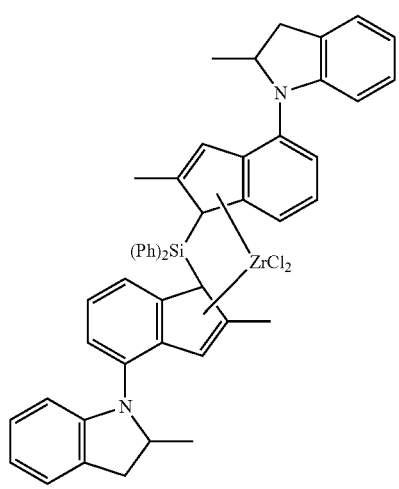
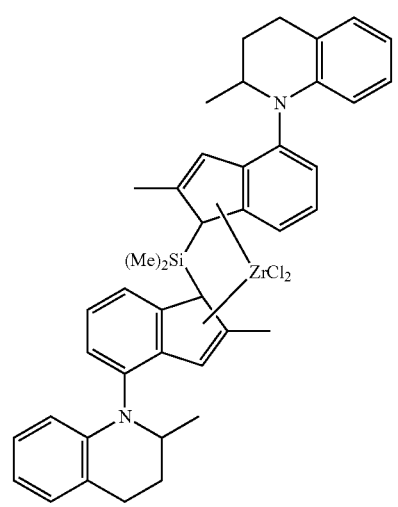
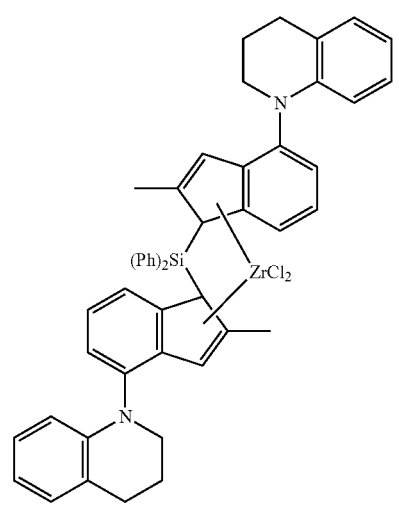

-continued
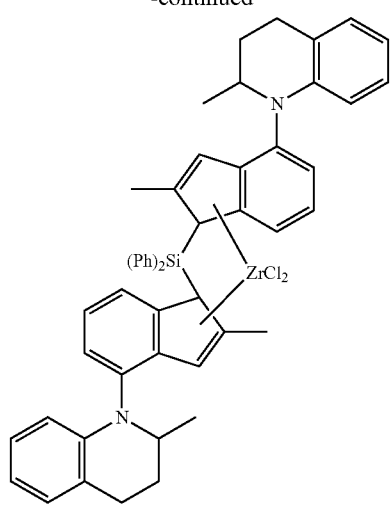
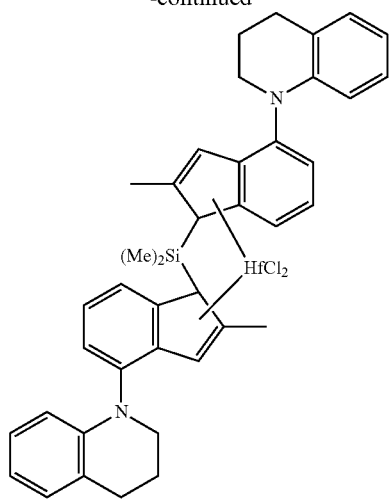
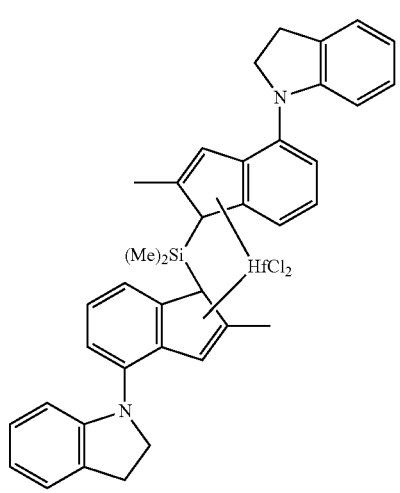
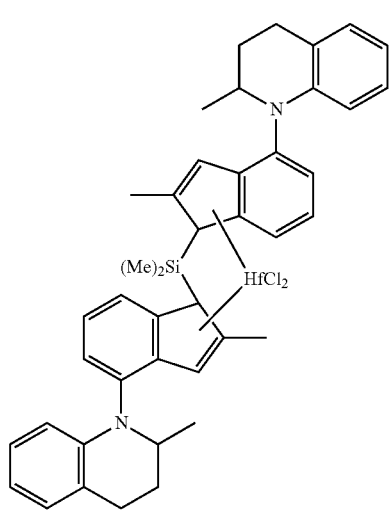
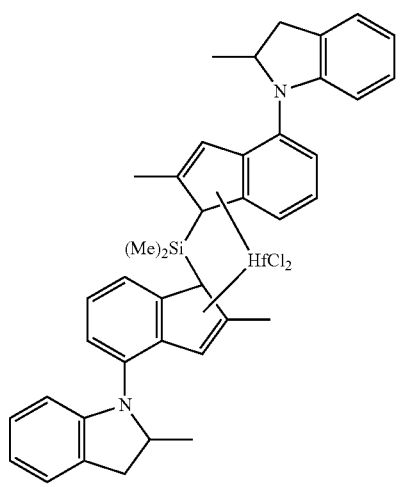
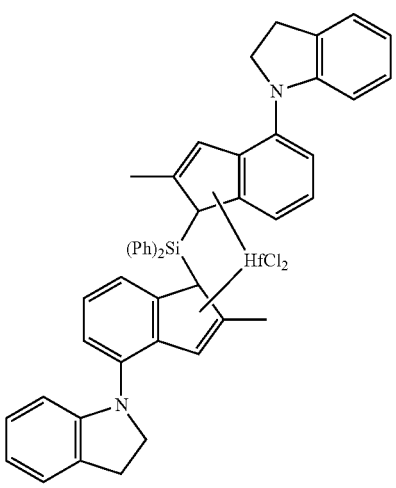

-continued

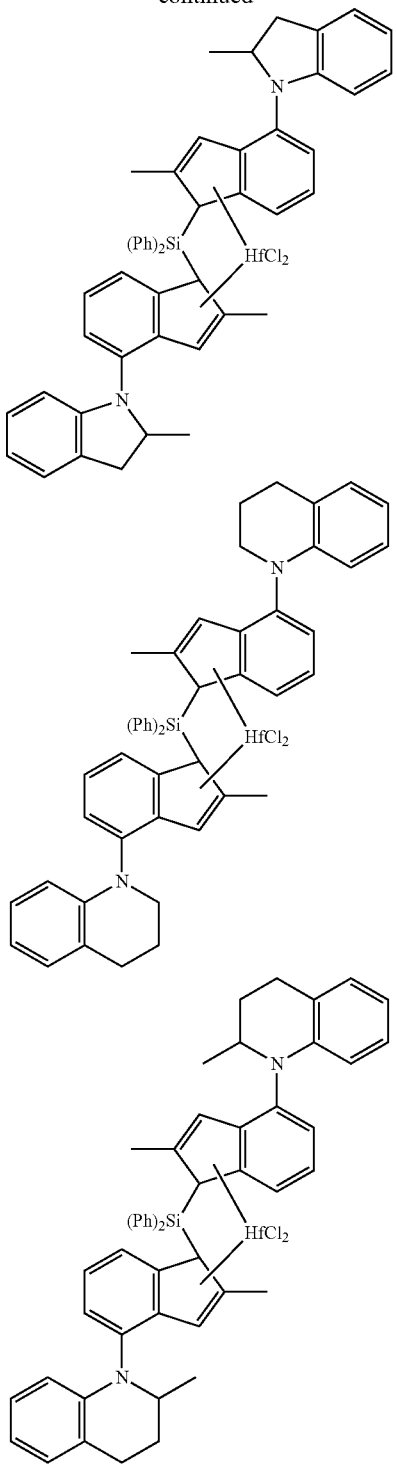

wherein Me represents a methyl group, and Ph represents a phenyl group.

Meanwhile, the catalyst composition used in the preparation method of an embodiment may further include one or more cocatalyst compounds selected from the group consisting of the following Chemical Formula 2 and Chemical Formula 3, in addition to the above described metallocene compound:

$$Al(R_{12})_3 \quad \text{[Chemical Formula 2]}$$

wherein $R_{12}$ is each independently halogen or hydrocarbyl having 1 to 20 carbon atoms, which is substituted or unsubstituted with halogen;

$$[L-H]^+[ZA_4]^- \text{ or } [L]^+[ZA_4]^- \quad \text{[Chemical Formula 3]}$$

wherein L is a neutral or cationic Lewis acid; H is a hydrogen atom; Z is a Group 13 element; and A is each independently aryl or alkyl having 6 to 20 carbon atoms, in which one or more hydrogen atoms thereof are substituted with halogen, hydrocarbyl having 1 to 20 carbon atoms, alkoxy, or phenoxy.

In the catalyst composition, a molar ratio of the transition metal of the compound represented by Chemical Formula 1 and aluminum of the compound represented by Chemical Formula 2 may be 1:1 to 1:1,000, preferably 1:5 to 1:250, and most preferably 1:5 to 1:50. Further, a molar ratio of the transition metal of the compound represented by Chemical Formula 1 and Group 13 element of the compound represented by Chemical Formula 3 may be 1:1 to 1:10, and preferably 1:1 to 1:5.

The compound represented by Chemical Formula 2 may include, but is not particularly limited to, preferably trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc., and a preferred compound may be selected from trimethylaluminum, triethylaluminum, and triisobutylaluminum.

Examples of the compound represented by Chemical Formula 3 may include trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, etc.; examples of a compound binding with a dialkylammonium salt may include di-(i-propyl)ammonium tetrakis(pentafluorophenyl)borate, dicyclohexylammonium tetrakis(pentafluorophenyl)borate, etc.; and examples of a compound binding with a carbonium salt may include tropylium tetrakis(pentafluorophenyl)borate, triphenylmethylium tetrakis(pentafluorophenyl)borate, benzene(diazonium) tetrakis(pentafluorophenyl)borate, etc.

In particular, preferred examples of the compound represented by Chemical Formula 3 may include N,N-dimethylanilinium tetrakis(pentafluorophenyl)borate, tributylammonium tetrakis(pentafluorophenyl)borate, di(octadecyl)methylammonium tetrakis(pentafluorophenyl)borate, di(octadecyl)(n-butyl)ammonium tetrakis(pentafluorophenyl)borate, triphenylmethylium tetrakis(pentafluorophenyl)borate, tropylium tetrakis(pentafluorophenyl)borate, etc.

In the preparation method of the propylene-based elastomer, the catalyst composition may further include a reaction solvent, and the reaction solvent may include a hydrocarbon-based solvent, such as pentane, hexane, heptane, etc.; or an aromatic solvent such as benzene, toluene, etc., but is not limited thereto.

As described above, the olefin-based monomer may further include alpha-olefin having 4 or more carbon atoms in addition to ethylene. The alpha-olefin having 4 or more carbon atoms may include 1-butene, 1-hexene, 1-octene, 1-pentene, 4-methyl-1-pentene, 1-hexene, 1-heptene, 1-decene, 1-undecene, 1-dodecene, etc.

In the preparation method of the above described propylene-based elastomer of an embodiment, the polymerization may be conducted at a temperature of about 25 to 200° C. or about 50 to 150° C. The polymerization process may be carried out by solution polymerization, in particular, continuous solution polymerization. In this regard, the above described catalyst composition may be used in the form of a homogeneous catalyst that is dissolved in the solution.

For carrying out the continuous solution polymerization, the polymerization step may be carried out while continuously providing the above described monomer composition and the catalyst composition including the metallocene compound, and optionally, the cocatalyst compound in the form of a solution to the reactor, and the copolymerization step may be continuously carried out while continuously discharging the polymerized propylene-based elastomer from the reactor.

Advantageous Effects

As described above, prepared is a propylene-based elastomer having high tacticity and excellent mechanical properties according to the present invention.

The propylene-based elastomer obtained according to the present invention overcomes the limitations of the previously known propylene-based elastomer prepared by a metallocene-based Group 4 transition metal catalyst, thereby satisfying high tacticity and excellent mechanical properties at the same time.

BRIEF DESCRIPTION OF DRAWINGS

FIG. 1 is a graph showing a relationship between ethylene content and triad tacticity in propylene-based elastomers of example and comparative example.

DETAILED DESCRIPTION OF THE EMBODIMENTS

The present invention will be explained in more detail in the following Examples. However, the following Examples are only for exemplifying the invention and the invention is not limited to the following Examples.

In the following Examples, the term "overnight" or "through the night" refers to about 12 to 16 hrs, and "room temperature" refers to 20 to 30° C. Organic reagents and solvents used were purchased from Aldrich and Merck, and used after purification by a standard method. In every steps of synthesis, experimental reproducibility was enhanced by blocking the contact with air and moisture. To confirm structures of the produced compounds, a 600 MHz nuclear magnetic resonance (NMR) spectrometer was used to obtain spectra.

Preparation Example: Synthesis of Ligand Compound and Transition Metal Compound

Preparation Example 1

Preparation Example 1-1: Synthesis of 1-(2-methyl-1H-inden-4-yl)-1,2,3,4-tetrahydroquinole To a 500 ml 2-neck Schlenk flask, 4-bromo-2-methyl-1H-indene (15.7 g, 75.63 mmol), 1,2,3,4-tetrahydroquinone (11.08 g, 83.19 mmol), LiOtBu (18.16 g, 226.89 mmol), $Pd(P(tBu)_3)_2$ (0.77 g, 1.5 mmol) were added, and the starting materials were dissolved by adding 252 mL of dry toluene, followed by stirring overnight in an oil bath at 110° C. The solution was cooled to room temperature, and then the reaction was terminated by adding 151 mL of deionized water thereto.

After separating an organic layer therefrom, an aqueous layer was extracted twice with 50 mL of dichloromethane (DCM). The organic layer was collected and dried over $Na_2SO_4$, and filtered, distilled, and dried under vacuum at 60° C. overnight to obtain an orange colored compound (15.8 g, quantitative yield compared to 4-bromo-2-methyl-1H-indene, 80% yield compared to the starting material).

$^1$H-NMR ($CDCl_3$): δ7.30-7.20 (m, 3H in isomers), 7.15-7.10 (d, J=7.5 Hz, 2H in isomers), 7.15-7.10 (d, J=8.0 Hz, 1H in isomers), 7.10-7.05 (d, J=8.0 Hz, 1H in isomers), 7.05-7.00 (d, J=7.5 Hz, 3H in isomers), 7.00-6.95 (d, J=7.5 Hz, 2H in isomers), 6.90-6.80 (t, J=7.5 Hz, 3H in isomers), 6.65-6.58 (m, 3H in isomers), 6.48 (s, 2H in isomers), 6.33 (s, 1H in isomers), 6.30-6.25 (d, J=8.0 Hz, 1H in isomers), 6.25-6.22 (d, J=8.0 Hz, 2H in isomers), 3.62-3.59 (t, J=5.5 Hz, 6H in 2-quinolinyl of isomers), 3.33 (s, 2H in 1H-indene of isomers), 3.10 (s, 3H in 1H-indene of isomers), 3.00-2.85

(m, 6H in 4-quinolinyl of isomers), 2.22-2.00 (m, 14H in 3H-quinolinyl and 2-Me of isomers)

Preparation Example 1-2: Synthesis of Bis(4-(3,4-dihydroquinolin-1(2H)-yl)-2-methyl-1H-inden-1-yl)-dimethyl silane To a 500 ml Schlenk flask, 1-(2-methyl-1H-inden-4-yl)-1,2,3,4-tetrahydroquinole (15.8 g, 60.5 mmol) was added, and the starting material was dissolved by adding 300 mL of dry diethyl ether, and then n-BuLi (2.5 M in n-Hx) (26.6 mL) was added thereto at −78° C., followed by stirring overnight at room temperature. Then, the mixture was filtered by using a glass frit (G4). The remaining solid on the glass frit was dried under vacuum to obtain a lithiated product (14.4 g, 89% yield) as a while solid. The lithiated product (14.2 g, 53.1 mmol) was put in a 500 mL Schlenk flask in a glove box and 152 mL of dry toluene and 7.6 mL of THF were added thereto for dissolving the same. After lowering the temperature to −30° C., $Me_2SiCl_2$ (3.2 mL, 26.6 mmol) was added thereto and the mixture was stirred at room temperature for a day. Thereafter, the mixture was stirred for 5 hrs in an oil bath at 140° C. After the mixture was cooled to room temperature, the reaction was terminated by adding 50 ml of deionized water.

After separating an organic layer therefrom, an aqueous layer was extracted twice with 50 mL of dichloromethane (DCM). The organic layer was collected and dried over $K_2CO_3$ and filtered, distilled, and dried under vacuum at 60° C. overnight to obtain a brownish white solid ligand compound (15.8 g, quantitative yield compared to lithiated product, 89% yield compared to the starting material). As the result of $^1$H-NMR analysis, the ratio of rac:meso was about 1:1.

$^1$H-NMR (CDCl$_3$): δ 7.40 (d, J=7.5 Hz, 2H, 7,7'-H in indenyl of rac-isomer), 7.25 (d, J=7.5 Hz, 2H, 7,7'-H in indenyl of meso-isomer), 7.15 (t, J=7.5 Hz, 2H, 6,6'-H in indenyl of rac-isomer), 7.12 (t, J=8.0 Hz, 2H, 6,6'-H in indenyl of meso-isomer), 7.10 (d, J=7.5 Hz, 2H, 5,5'-H in quinolinyl of rac-isomer), 7.08 (d, J=7.5 Hz, 2H, 5,5'-H in quinolinyl of meso-isomer), 7.02 (dd, J$_1$=7.0 Hz, J$_2$=1.0 Hz, 4H, 5,5'-H in indenyl of rac- and meso-isomers), 6.85-6.81 (m, 4H, 7,7'-H in quinolinyl of rac- and meso-isomers), 6.60 (td, J$_1$=7.5 Hz, J$_2$=1.0 Hz, 4H, 6,6'-H in quinolinyl of rac- and meso-isomers), 6.46 (s, 4H, 3,3'-H in indenyl of rac- and meso-isomers), 6.26 (d, J=8.0 Hz, 4H, 8,8'-H in quinolinyl of rac- and meso-isomers), 3.81 (s, 2H, 1,1'-H in indenyl of rac-isomer), 3.79 (s, 2H, 1,1'-H in indenyl of meso-isomer), 3.69-3.57 (m, 8H, 2,2'-H in quinolinyl of rac- and meso-isomers), 2.92 (t, J=6.0 Hz, 8H, 4,4'-H in quinolinyl of rac- and meso-isomers), 2.21 (d, J=0.5 Hz, 6H, 2,2'-Me in meso-isomer), 2.13 (d, J=1.0 Hz, 6H, 2,2'-Me in rac-isomer), 2.13-2.08 (m, 8H, 3,3'-H in quinolinyl of rac- and meso-isomers), −0.27 (s, 3H, SiMe of meso-isomer), −0.29 (s, 6H, SiMe$_2$ of rac-isomer), −0.30 (s, 3H, SiMe'-of meso-isomer)

Preparation Example 1-3: Synthesis of rac-dimethylsilylene-bis(4-(3,4-dihydroquinolin-1(2H)-yl)-2-methyl-indenyl) zirconium dichloride To a 500 ml Schlenk flask, 10.4 g (18 mmol, rac:meso=1:1) of bis(4-(3,4-dihydroquinolin-1(2H)-yl)-2-methyl-1H-inden-1-yl)-dimethyl silane was added, and the starting material was dissolved by adding 285 mL of dry toluene, and then 14.4 mL of n-BuLi (2.5 M in n-Hx) was added thereto at −78° C., followed by stirring for 5 hrs at room temperature. The mixture was cooled to −78° C., and transferred to a Schlenk flask, in which 4.2 g of ZrCl$_4$ solution (18 mmol in 60 mL toluene) of −78° C. was put in advance, by using a cannula, followed by stirring at room temperature overnight. After the reaction was terminated, the product was filtered with a glass frit (G4) on which celite spread. The remaining solid on the glass frit was washed three times with about 5 mL of dry toluene. The toluene solution was dried under vacuum to obtain a red colored solid. The remaining solid on the glass frit was dissolved out by using dichloromethane (DCM). A red colored solid was obtained by drying the DCM filtrate under vacuum. As the result of $^1$H-NMR analysis, both of two solids were Zr complex of rac:meso=1:1. This crude product was collected and stored in the oil bath of 45° C., and 50 mL of dry toluene was added thereto with stirring for dissolving the crude product. The solution was stored in a freezer of −30° C. for 3 days for recrystallization. The obtained red solid was filtered with a glass frit (G4) and washed twice with 5 mL of dry n-hexane, and dried under vacuum to obtain 1.3 g (1.9 mmol, 10.4% yield) of the final product of racemic body.

$^1$H-NMR (Tol-d$_3$): δ 7.19 (d, J=8.5 Hz, 2H, 7,7'-H in indenyl), 7.02 (d, J=7.5 Hz, 2H, 5,5'-H in quinolinyl), 6.92 (d, J=7.5 Hz, 2H, 5,5'-H in indenyl), 6.85-6.82 (m, 2H, 7,7'-H in quinolinyl), 6.76 (dd, J$_1$=8.5 Hz, J$_2$=7.5 Hz, 2H, 6,6'-H in indenyl), 6.70-6.68 (m, 2H, 6,6'-H in quinolinyl), 6.67 (s, 2H, 3,3'-H in indenyl), 6.54 (d, J=8.5 Hz, 2H, 8,8'-H in quinolinyl), 3.85-3.69 (m, 4H, 2,2'-H in quinolinyl), 2.65-2.54 (m, 4H, 4,4'-H in quinolinyl), 1.95 (s, 6H, 2,2'-Me), 1.90-1.70 (m, 4H, 3,3'-H in quinolinyl), 0.84 (s, 6H, SiMe$_2$)

Preparation Example 2

Synthesis of rac-dimethylsilylene-bis(4-(3,4-dihydroquinolin-1(2H)-yl)-2-methyl-indenyl)hafnium dichloride To a 250 ml Schlenk flask, 3 g (5.2 mmol, rac:meso=1:1) of bis(4-(3,4-dihydroquinolin-1(2H)-yl)-2-methyl-1H-inden-1-yl)-dimethyl silane prepared in Preparation Example 1-2 was added, and the starting material was dissolved by adding 85 mL of dry toluene, and then 4.4 mL of n-BuLi (2.5 M in n-Hx) was added thereto at −78° C., followed by stirring for 5 hrs at room temperature. The mixture was cooled to −78° C., and transferred to a Schlenk flask, in which 1.7 g of HfCl$_4$ solution (5.2 mmol in 20 mL toluene) of −78° C. was put in advance, by using a cannula, followed by stirring at room temperature overnight. After the reaction was terminated, the product was filtered with a glass frit (G4) on which celite spread. The remaining solid on the glass frit was washed three times with about 3 mL of dry toluene. The toluene solution was dried under vacuum to obtain a red colored solid. The remaining solid on the glass frit was dissolved out by using dichloromethane (DCM). A red colored solid was obtained by drying the DCM filtrate under vacuum. As the result of $^1$H-NMR analysis, both of two solids were Hf complex of rac:meso=1:1. This crude product was collected and stored in the oil bath of 45° C., and 50 mL of dry toluene was added thereto with stirring for dissolving the crude product. The solution was stored in a freezer of −30° C. for 3 days for recrystallization. The obtained red solid was filtered with a glass frit (G4) and washed twice with 3 mL of dry n-hexane, and dried under vacuum to obtain 1.0 g (1.2 mmol, 23% yield) of the final product of racemic body.

$^1$H-NMR (Tol-d$_3$): δ 7.23 (d, J=9.0 Hz, 2H, 7,7'-H in indenyl), 6.98 (d, J=7.5 Hz, 2H, 5,5'-H in quinolinyl), 6.90

(d, J=7.0 Hz, 2H, 5,5'-H in indenyl), 6.82-6.79 (m, 2H, 7,7'-H in quinolinyl), 6.72 (dd, J$_1$=8.5 Hz, J$_2$=7.5 Hz, 2H, 6,6'-H in indenyl), 6.68-6.65 (m, 2H, 6,6'-H in quinolinyl), 6.57 (s, 2H, 3,3'-H in indenyl), 6.51 (d, J=8.5 Hz, 2H, 8,8'-H in quinolinyl), 3.81-3.66 (m, 4H, 2,2'-H in quinolinyl), 2.63-2.53 (m, 4H, 4,4'-H in quinolinyl), 2.03 (s, 6H, 2,2'-Me), 1.87-1.67 (m, 4H, 3,3'-H in quinolinyl), 0.82 (s, 6H, SiMe$_2$)

Example: Preparation of Propylene-Based Elastomer

Examples 1 to 7

A hexane solvent (5 kg/h) and ethylene and propylene monomers were continuously fed at a high pressure of 90 to 100 bar to a 1.5 L continuous stirred reactor which was preheated at 80° C., and solution polymerization was carried out at a pressure of 89 bar. 0.025 mM triphenylcarbenium tetrakis(pentafluorophenyl) borate cocatalyst was put in the reactor by providing high pressure argon. The transition metal compound (0.25 mM) of Preparation Example 2 treated with a triisobutylaluminum compound was put in a catalyst storage tank and subsequently put in the reactor by providing high pressure argon. These two components were separately pumped, and the reactor temperature was controlled by controlling the temperature of oil passing through a reactor jacket. The polymer density was controlled by varying a weight ratio of propylene/ethylene.

After polymerization, the polymers were separated from a discharge stream, and unreacted ethylene and propylene were separated from a dilute mixture stream. The polymers thus obtained were dried in a vacuum oven at 80° C. for 12 hrs or longer and then physical properties thereof were measured.

Polymerization conditions for the propylene-based elastomers of Examples 1 to 7 are given in Table 1.

Comparative Examples 1 to 4

Commercially available propylene-based elastomers, Vistamaxx™6120, Vistamaxx™6202, Vistamaxx™3020, and Vistamaxx™3980 of Exxon Corp. were used as Comparative Examples 1 to 4, respectively and physical properties thereof were measured by the following method.

<Measurement Method of Physical Properties of Propylene Elastomer>

Measurement of Triad Tacticity

The copolymers of examples and comparative examples were analyzed by $^{13}$C-NMR to calculate peak areas of PPP(mm), PPP(mr) and PPP(rr). Their triad tacticity was calculated, based on the following Mathematical Equation 1. In this regard, a 600 MHz Bruker Avance III HD NMR instrument was used for measurement, and each copolymer was dissolved in a 1,1,2,2,-tetrachloroethane solvent, and analyzed at 120° C.

triad tacticity (%)=PPP(mm)/{PPP(mm)+PPP(mr)+ PPP(rr)}*100    [Mathematical Equation 1]

Measurement of Density

Density was measured at 23° C. using METTLER TOLEDO XS104 in accordance with the ASTM D1505 standard, and given in the following Tables 2 and 3.

Measurement of MFR

MFR was measured at 230° C. under a load of 2.16 kg using a Dynisco D4002HV instrument in accordance with the ASTM D1238 standard, and given in the following Tables 2 and 3.

Measurement of Tensile Strength and Elongation

Tensile strength and elongation were measured using an INSTRON 4465 instrument in accordance with the ASTM D638 standard, and given in the following Tables 4 and 5.

Measurement of Hardness

Hardness was measured using Mitutoyo CTS-103 and CTS-104 instruments in accordance with the ASTM D2240 standard, and given in the following Tables 4 and 5.

Measurement of Flexural Strength

Flexural strength was measured using an INSTRON 3365 instrument in accordance with the ASTM D790 standard, and given in the following Tables 4 and 5.

Measurement of Tear Strength

Tear strength was measured using an INSTRON 3365 instrument in accordance with the ASTM D624 standard, and given in the following Tables 4 and 5.

TABLE 1

Polymerization conditions of examples

| | Catalyst | Cocatalyst | AlR3 | Polymerization temperature | Propylene Unit | Ethylene | Ethylene/ propylene | Yield | Activity |
|---|---|---|---|---|---|---|---|---|---|
| | ml/min | ml/min | ml/mim | ° C. | kg/h | kg/h | mol ratio | g/h | kg/g (catalyst) |
| Example 1 | 3.00 | 3.00 | 1.6 | 77.8 | 1.8 | 0.23 | 0.192 | 909 | 244.6 |
| Example 2 | 3.25 | 3.25 | 5.0 | 78.8 | 1.8 | 0.22 | 0.183 | 1027 | 254.8 |
| Example 3 | 3.00 | 3.00 | 1.6 | 77.5 | 1.8 | 0.18 | 0.167 | 865 | 232.5 |
| Example 4 | 2.20 | 2.20 | 5.0 | 77.9 | 1.8 | 0.20 | 0.167 | 871 | 319.5 |
| Example 5 | 1.00 | 1.00 | 5.0 | 80.0 | 1.8 | 0.18 | 0.150 | 1034 | 834.3 |
| Example 6 | 1.60 | 0.80 | 2.6 | 75.6 | 1.8 | 0.15 | 0.125 | 770 | 388.2 |
| Example 7 | 3.00 | 3.00 | 1.6 | 77.0 | 1.8 | 0.14 | 0.117 | 873 | 234.7 |

TABLE 2

Evaluation of physical properties of examples

| | Content of repeating unit | | | | Triad tacticity | | |
|---|---|---|---|---|---|---|---|
| Example | Propylene (% by weight) | Ethylene (% by weight) | Density | MFR | mm | mr | rr |
| Example 1 | 84.0 | 16.0 | 0.861 | 31.0 | 61.5 | 32.8 | 5.7 |
| Example 2 | 84.6 | 15.4 | 0.863 | 37.2 | 63.5 | 31.5 | 4.9 |

TABLE 2-continued

Evaluation of physical properties of examples

| Example | Content of repeating unit Propylene (% by weight) | Content of repeating unit Ethylene (% by weight) | Density | MFR | Triad tacticity mm | Triad tacticity mr | Triad tacticity rr |
|---|---|---|---|---|---|---|---|
| Example 3 | 84.9 | 15.1 | 0.867 | 36.8 | 64.2 | 30.6 | 5.1 |
| Example 4 | 85.3 | 14.7 | 0.870 | 47.6 | 65.0 | 30.4 | 4.6 |
| Example 5 | 86.4 | 13.6 | 0.874 | 37.8 | 67.2 | 28.8 | 4.0 |
| Example 6 | 87.4 | 12.6 | 0.878 | 30.2 | 70.4 | 26.0 | 3.6 |
| Example 7 | 87.9 | 12.1 | 0.879 | 52.7 | 71.3 | 24.9 | 3.8 |

TABLE 3

Evaluation of physical properties of comparative examples

| Comparative Example | Content of repeating unit Propylene (% by weight) | Content of repeating unit Ethylene (% by weight) | Density | MFR | Triad tacticity mm | Triad tacticity mr | Triad tacticity rr |
|---|---|---|---|---|---|---|---|
| Comparative Example 1 | 83.4 | 16.6 | 0.862 | 3.0 | 57.8 | 30.6 | 11.7 |
| Comparative Example 2 | 84.0 | 16.0 | 0.863 | 20 | 58.5 | 30.3 | 11.2 |
| Comparative Example 3 | 87.2 | 12.8 | 0.874 | 3.0 | 67.2 | 25.8 | 7.0 |
| Comparative Example 4 | 89.1 | 10.9 | 0.878 | 8.0 | 70.0 | 23.4 | 6.6 |

TABLE 4

Evaluation of physical properties of examples

| Physical properties | ASTM | Unit | Example 1 | Example 2 | Example 5 | Example 6 |
|---|---|---|---|---|---|---|
| Elongation | D638 | % | >1000 | >1000 | >1000 | 927.1 |
| Tensile strength (at Break) | D638 | Kgf/cm$^2$ | 132.7 | 137.7 | 195.1 | 227.8 |
| Tensile strength (100% strain) | D638 | Kgf/cm$^2$ | 16.7 | 25.0 | 51.8 | 63.0 |
| Tensile strength (200% strain) | D638 | Kgf/cm$^2$ | 19.5 | 29.4 | 54.9 | 61.9 |
| Tensile strength (300% strain) | D638 | Kgf/cm$^2$ | 22.7 | 34.3 | 59.1 | 66.3 |
| Tensile strength (500% strain) | D638 | Kgf/cm$^2$ | 37.3 | 50.2 | 79.5 | 106.7 |
| Tear strength | D624 | N/cm | 319.6 | 415.7 | 738.6 | 770.3 |
| Flexural Strength | D790 | Kgf/cm$^2$ | 15.5 | 20.4 | 29.6 | 48.8 |
| Flexural modulus (1% secant) | D790 | Kgf/cm$^2$ | 178.1 | 232.0 | 440.7 | 781.9 |
| Hardness (Shore A) | D2240 | — | 61.1 | 68.9 | 75.4 | 87.9 |
| Hardness (Shore D) | D2240 | — | 12.8 | 16.0 | 28.0 | 34.3 |

TABLE 5

Evaluation of physical properties of comparative examples

| Physical properties | ASTM | Unit | Comparative Example 1 | Comparative Example 2 | Comparative Example 3 | Comparative Example 4 |
|---|---|---|---|---|---|---|
| elongation | D638 | % | >1000 | >1000 | 777.1 | 861.5 |
| Tensile strength (at Break) | D638 | Kgf/cm$^2$ | 143.9 | 99.8 | 242.8 | 245.8 |
| Tensile strength (100% strain) | D638 | Kgf/cm$^2$ | 17.1 | 16.2 | 46.0 | 61.2 |
| Tensile strength (200% strain) | D638 | Kgf/cm$^2$ | 19.8 | 18.7 | 47.5 | 60.0 |
| Tensile strength (300% strain) | D638 | Kgf/cm$^2$ | 23.2 | 21.4 | 52.3 | 63.9 |

TABLE 5-continued

Evaluation of physical properties of comparative examples

| Physical properties | ASTM | Unit | Comparative Example 1 | Comparative Example 2 | Comparative Example 3 | Comparative Example 4 |
|---|---|---|---|---|---|---|
| Tensile strength (500% strain) | D638 | Kgf/cm$^2$ | 35.1 | 29.5 | 90.6 | 100.5 |
| Tear strength | D624 | N/cm | 346.0 | 347.7 | 650.6 | 730.7 |
| Flexural Strength | D790 | Kgf/cm$^2$ | 10.6 | 10.5 | 32.3 | 47.3 |
| Flexural modulus (1% secant) | D790 | Kgf/cm$^2$ | 109.2 | 111.2 | 372.3 | 737.2 |
| Hardness (Shore A) | D2240 | — | 57.8 | 58.0 | 84.8 | 91.9 |
| Hardness (Shore D) | D2240 | — | 13.0 | 11.2 | 28.4 | 35.1 |

Referring to Tables 2 to 5 and FIG. 1, it was confirmed that ethylene content x and triad tacticity y in the propylene-based copolymers of Examples 1 to 7 satisfy a relationship of y≥−2.27x+97.0, and the copolymers exhibit excellent mechanical properties such as elongation, flexural modulus, tear strength, etc.

In contrast, it was confirmed that ethylene content x and triad tacticity y of the propylene-based copolymers of Comparative Examples 1 to 4 do not satisfy the above relationship, and the copolymers exhibit low values in mechanical properties such as elongation, flexural modulus, tear strength, etc., compared to the propylene-based copolymers of Examples.

Accordingly, it is suggested that the propylene-based copolymers of Examples have high tacticity, considering their ethylene content, and therefore, they are excellent in the mechanical properties such as elongation, flexural modulus, strength, etc., compared to conventional propylene-based copolymers.

The invention claimed is:

1. A propylene-based elastomer comprising 50% by weight or more of a propylene-based repeating unit, and a residual amount of an olefin-based repeating unit comprising ethylene, wherein an ethylene content x (% by weight) and triad tacticity y (%) satisfy a relationship of y≥−2.27x+97.0, and wherein the olefin-based repeating unit further comprises alpha-olefin having 4 or more carbon atoms, and the triad tacticity y (%) is 50 to 80.

2. A propylene-based elastomer comprising 50% by weight or more of a propylene-based repeating unit, and a residual amount of an olefin-based repeating unit comprising ethylene, wherein an ethylene content x (% by weight) and triad tacticity y (%) satisfy a relationship of y≥−2.27x+97.0, and wherein the olefin-based repeating unit further comprises alpha-olefin having 4 or more carbon atoms, and the relationship is satisfied in the entire ethylene content range of 10 to 20% by weight.

3. The propylene-based elastomer of claim 1, wherein the propylene-based elastomer has a density of 0.860 to 0.890 g/cm$^3$.

4. The propylene-based elastomer of claim 2, wherein the propylene-based elastomer has a density of 0.860 to 0.890 g/cm$^3$.

* * * * *